United States Patent [19]

Blackshear

[11] Patent Number: 4,918,473

[45] Date of Patent: Apr. 17, 1990

[54] SURVEILLANCE CAMERA SYSTEM

[75] Inventor: David M. Blackshear, Molena, Ga.

[73] Assignee: Diamond Electronics, Inc., Carroll, Ohio

[21] Appl. No.: 163,257

[22] Filed: Mar. 2, 1988

[51] Int. Cl.$^{4}$ ............ G03B 29/00
[52] U.S. Cl. ............ 354/81; 358/108
[58] Field of Search ............ 354/81; 358/108

[56] References Cited

U.S. PATENT DOCUMENTS

| | | | |
|---|---|---|---|
| 3,819,856 | 6/1974 | Pearl et al. | 178/7.81 |
| 3,916,097 | 10/1975 | Imai | 178/7.2 |
| 3,993,866 | 11/1976 | Pearl et al. | 178/7.81 |
| 4,225,881 | 9/1980 | Tovi | 358/108 |
| 4,320,949 | 3/1982 | Pagano | 354/81 |

FOREIGN PATENT DOCUMENTS

| | | |
|---|---|---|
| 984038 | 2/1976 | Canada . |
| 1433527 | 4/1976 | United Kingdom . |

*Primary Examiner*—Michael L. Gellner
*Attorney, Agent, or Firm*—Thomas & Kennedy

[57] ABSTRACT

A surveillance camera system comprises a spherical housing that has a lower, hemispherically shaped, gold coated dome 12 with a geometric center. A camera mount is mounted in the housing for panning movements about a pan axis that extends through the dome center and for tilting movements about a tilt axis that transverses the pan axis through the dome center. Electric motors 24/27 are mounted in the housing for panning and tilting the camera mount. A video CCD type camera 30 is mounted upon the camera mount with its center of gravity located adjacent the pan and tilt axes. A rotary electric coupler 39 is mounted to the housing and electric connectors provided for connecting the camera and the motors with an ancillary video display and camera orientation controller through the rotary coupler.

17 Claims, 2 Drawing Sheets

SURVEILLANCE CAMERA SYSTEM

TECHNICAL FIELD

This invention relates to surveillance camera systems of the type that have encapsulated cameras mounted hidden from view and orientationally controllable by operators from remote locations through a servo-type control system.

BACKGROUND OF THE INVENTION

Today, surveillance camera systems are commonly employed as a security measure. The cameras are normally used to generate a video image of an area under surveillance that is displayed and/or recorded for use by security personnel. In some cases one or more cameras are mounted to a wall or dependent from a ceiling where they may be observed by people within the area under surveillance. In other cases the cameras are hidden from view as by being placed behind one-way mirror domes or the like to avoid creating an objectionable presence and to make it difficult or to worry potential wrongdoers by making it impossible for them to locate the cameras and to see where they are directed.

Surveillance camera systems of the types just described have had several problems and limitations associated with their use. For example, where they have been located within domes that move in unison with cameras, they have not been usable outdoors due to adherence to, and accummulation of, snow and ice. Even indoors, movements of the dome may be visually detected which is undesirable for discreet surveillance.

Surveillance cameras of the prior art have also operated in preprogrammed manners in order to provide full, continuous coverage of areas of surveillance. Where manual control of the cameras has been provided, the cameras have tended not to produce smooth, continuous images since abrupt, manually controlled movements have tended to cause the cameras to wobble and vibrate, particularly where they are brought to halts as when a security guard identifies an area of interest and wishes to direct the camera in that direction for a period of time. Thus, most have been limited to about 6° movement per second rates. The cameras have also typically been incapable of continuous, 360°—plus panning movements. Instead, these have been mounted to actuate limit switches that border ends of arcuate paths of camera travel which serve to reverse their direction of panning movements.

It thus is seen that a need exists for a surveillance camera system that may be centrally located, indoors and outdoors, and be capable of continuous 360°—plus scanning of a surveillance area. It would also be desirable for the camera to be manually controllable in a smooth manner without the camera jerking, wobbling and producing unsteady images during accelerations and deaccelerations. It would further be desirable to render the camera hidden from view without sacrifice in video quality of images produced by the camera. It further would be desirable to provide such a camera in a compact, stationery dome type housing, with an aesthetically pleasing configuration, and with the camera and its controls being readily accessible for maintenance from time to time. It is to the provision of such a surveillance camera system, therefore, that the present invention is primarily directed.

SUMMARY OF THE INVENTION

A surveillance camera system comprises a housing that includes an at least partially transparent, generally hemispherically shaped dome that has a geometric center. A camera mount is mounted within the housing for panning movements about a pan axis, that extends through the dome center, and for tilting movements about a tilt axis that transverses the pan axis and passes closely adjacent to the dome center. Electric motor means are mounted within the housing for panning and tilting the camera mount. A camera is mounted upon the camera mount with its center of gravity located adjacent to the pan and tilt axes. Rotary electric coupling means are also mounted to the housing. Electric connector means are provided for connecting the camera and motor means with an ancillary video display and camera orientation control means through the rotary coupling means.

DETAILED DESCRIPTION

Figure 1:
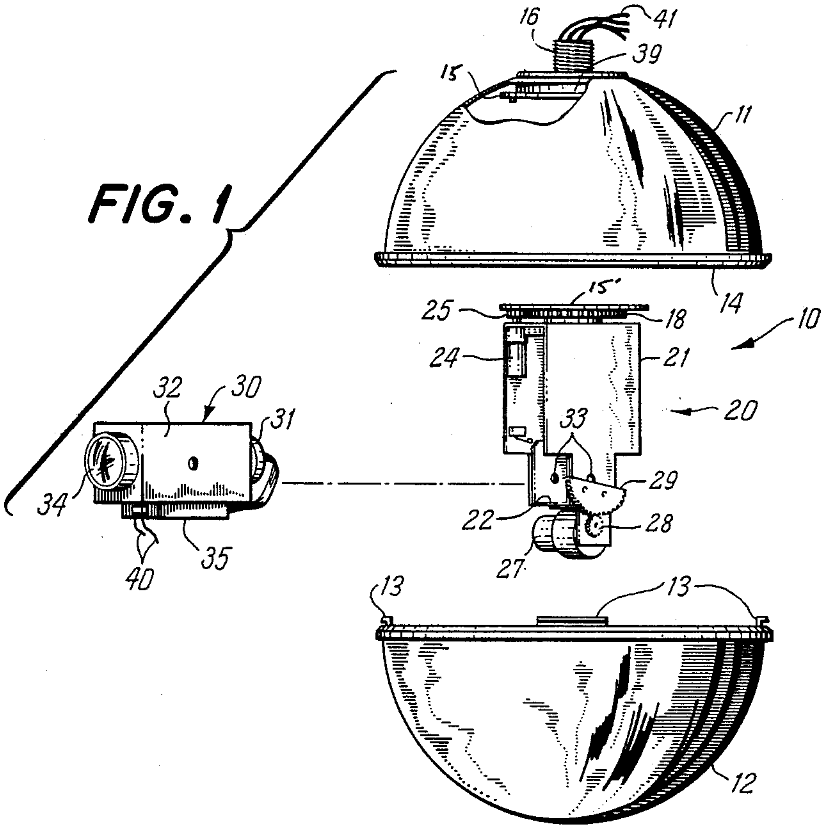
FIG. 1 is an exploded, side elevational view of a surveillance camera system embodying principles of the invention in a preferred form.
Figure 2:
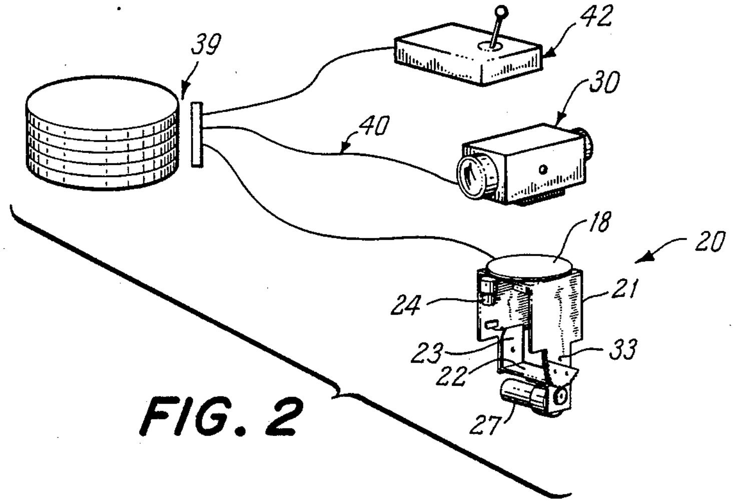
FIG. 2 is a diagrammatical view of the electrical connections of components of the surveillance camera system illustrated in FIG. 1.

With reference next to the drawing, there is shown a surveillance camera system 10 which has a generally spherical housing provided by an upper, hemispherically shaped dome 11 and a lower, hemispherically shaped dome 12. The upper dome is opaque while the lower dome 12 is semi-transparent. The lower dome is formed of a clear plastic substrate the interior of which is vacuum metalized with a thin layer of gold such as to provide approximately 68% light transmissibility. The upper dome 11 is also metalized with a thin layer of gold to match the color of the lower dome for spherical aesthetic uniformity. The lower dome 12 is releasibly fastened to the upper dome 11 by means of a set of four interlocking tabs 13 that may be rotary positioned onto mating supports about the lower rim 14 of the upper dome. The upper dome 11 has a double unit mounting plate 15 from which a threaded, tubular neck 16 upwardly extends. An upper unit of the mounting plate is permanently secured to the upper dome while the lower unit is releasably secured to the upper by unshown, spring loaded, quick disconnect means. A sun gear 18 is rigidly mounted beneath the mounting plate 15 adjacent a rotary electrical connector or slip ring assembly 39.

The surveillance camera system 10 further includes a camera mount indicated generally at 20 which is rotatably suspended from the mounting plate 15. The camera mount comprises an inverted U-shaped fork 21 which tiltably supports a U-shaped platform or saddle 22. An electric motor 24 is mounted to the fork 21 to the drive shaft of which a planetary gear 25 is secured and placed in mesh with the sun gear 18. Another electric motor 27 is mounted to the fork 21 which has a pinion gear 28 in mesh with a half ring gear 29 that is rigidly secured to the platform 22. With this construction operation of the electric motor 24 causes the fork 21 to rotate about a vertical pan axis that extends through the center of the spherical housing and along the axis of the threaded neck 16. Operation of the other motor 27 causes the platform 22 to tilt about a horizontal axis that is located close to or just beneath the center of the spherical housing.

The surveillance camera system further includes a video camera 30 such as a Model DE-3112 CCD video camera sold by Diamond Electronics, Inc. The video camera is rigidly mounted upon the platform or saddle 22 with its center of gravity located approximately along the tilt axis of the platform that extends between two pivots 33. The video camera is specially configured to achieve this by having its CCD sensor 31 located to the rear of the optics housing 32 to the opposite end of which a lens 34 is mounted. A ribbon cable extends from the sensor to a camera electronics box 35 that is directly mounted upon the saddle 22. Thus, it is seen that upon actuation of motor 27 the video camera is tilted about an axis that extends substantially through the center of gravity of the camera as the platform or saddle 22 is tilted about the tilt axis that extends through the detents 33. Upon actuation of motor 24 the camera is turned or panned about its vertical or pan axis.

Figure 3:
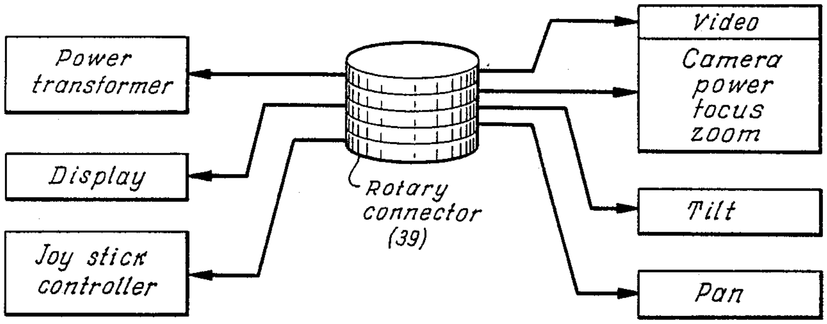
FIG. 3 is a block diagram of functions executed by the surveillance camera system of FIG. 1.

The video camera is conventionally provided with terminals for connecting the camera with electrical power and with focus and zoom controls. Electrical connectors 40 extend from the camera to a rotary connector or slip ring assembly 39 that is mounted to the mounting member 15 just above and coaxially aligned with the sun gear 18. As indicated in FIG. 3, electrical connectors also extend from the motors 24 and 27 to the rotary connector for pan and tilt operations.

The rotary connector 39 itself is conventional and has a set of electrically conductive rings against which a set of conductive brushes are movably mounted in direct electrical and mechanical brushing contact. Other connectors 41 extend from an ancillary source of electrical power and from a joy stick controller 42 to the rotary connector. The joy stick controller 42 is connected so that its single stick can be utilized to control both pan and tilt by x-y axis manual movements of the stick. Preferably, the controller 42 may also be operated in an automated, programmed mode for area surveillance.

Figure 4:
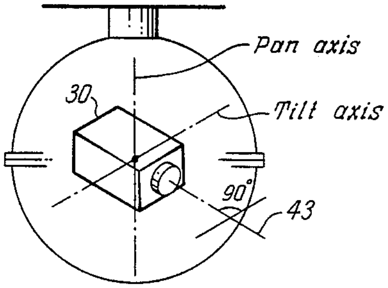
FIG. 4 is a schematic diagram showing the location of the center of gravity of the surveillance camera system illustrated in FIG. 1.

As shown in FIG. 4, the center of gravity of the camera 30 is located on or very close to a vertical pan axis and to a horizontal tilt axis. These axes are also located so as to extend through or close to the center of the spherical housing that is comprised of the upper and lower domes. Where horizontal camera orientation is desired, the camera would, of course, be located slightly below the housing center since, as previously stated, the upper dome here is opaque to inhibit creation of back lighting that could silhouette the camera 30 and render it visible through the lower dome. With this location of the camera its optical axis 43 is always oriented normal to the tangent of the dome 12 regardless of its orientation with respect to the pan and tilt axes. This serves to minimize dome generated image refractions being transmitted to the camera and thereby impeding optical quality.

For operation, the camera may be suspended from a room ceiling or pendant mount by threading the neck 16 into a socket and establishing the electrical connections with the rotary connector 39. The camera may then be operated so as to scan an area under surveillance located beneath and about it. As this is done the camera is hidden from view since only a gold color, reflective ball-like object, or dome in a false ceiling version, is viewable by people in the surveillance area.

Should an operator, such as a security guard, see an activity of possible interest to him on his video display screen, he may then may orient the camera by operation of the joy stick and then zoom into the area of interest for a magnified view. In doing so the displacement of the stick from its zero point is proportional to the speed of camera movement.

With the center of gravity of the camera located closely adjacent the pan and tilt axes, high speed camera movements may be made and the camera brought to rather abrupt halts quite smoothly with very little wobbling action developed by camera and camera mount momentum. Thus, the CCD camera, with its unique modular configuration and mounting, is kinematically balanced with movement rates of 80° per second achieved. The central location of the camera within a spherically or at least a hemispherically-shaped housing dome also provides for a compact unit. The semi-transparent, gold coating of the dome, in combination with the normal directing of the camera optical axis onto the lower dome in all camera orientations, further provides for high quality, low distortion video imaginq by the camera while it remains hidden from view from ambience within a stationery housing. The unique multiple-use of the rotary electrical connector, in combination with the quick disconnect provided by the multiple unit mounting plate, enables the camera system to be easily installed and serviced and provides for continuous, unidirectional panning.

It thus is seen that a surveillance camera system is now provided which overcomes problems long associated with those of the prior art. It should be understood however that the just described embodiment merely illustrates principles of the invention in a preferred form. Many modifications, additions and deletions may, of course, be made thereto without departure from the spirit and scope of the invention as set forth in the following claims.

I claim:

1. A surveillance camera system comprising a housing that includes an at least partially transparent, generally hemispherically shaped dome having a geometric center; a camera mount mounted within said housing for panning movements about a pan axis that extends through or closely adjacent to said dome center and for tilting movements about a tilt axis that transverses said pan axis through or closely adjacent to said dome center; electric motor means mounted within said housing for panning and tilting said camera mount; a camera mounted upon said camera mount with its center of gravity located adjacent said pan and tilt axes; rotary electric coupling means mounted to said housing; and electric connector means for connecting said camera and said motor means with an ancillary video display and camera orientation control means through said rotary coupling means, said rotary electric coupling means being adapted to transmit electrical signals during continuous unidirectional panning movement of said camera mount.

2. The surveillance camera system of claim 1 wherein said housing comprises a second generally hemispherically shaped dome mounted to said at least partially transparent, generally hemispherically shaped dome to form in combination therewith a generally spherically shaped housing.

3. The surveillance camera system of claim 2 wherein said dome is releasibly mounted to said second dome.

4. The surveillance camera system of claim 2 wherein said second dome is opaque.

5. The surveillance camera system of claim 1 wherein said dome is semi-transparent.

6. The surveillance camera system of claim 5 wherein said dome has a transparent substrate coated with gold.

7. The surveillance camera system of claim 1 wherein said camera mount comprises an inverted U-shaped fork to which a platform is tiltably mounted, and wherein said camera is mounted to said platform.

8. The surveillance camera system of claim 7 wherein said motor means comprises a sun gear rigidly mounted to said housing coaxially with respect to said rotary coupling means, an electric motor mounted to said fork, and a planetary gear mounted to the drive shaft of said electric motor in mesh with said sun gear.

9. The surveillance camera of claim 8 wherein said motor means further comprises a second sun qear rigidly mounted to said platform, a second electric motor mounted to said fork, and a second planetary qear mounted to the drive shaft of said second electric motor in mesh with said second sun gears.

10. The surveillance camera system of claim 1 wherein said camera is a video CCD type camera.

11. A surveillance camera system comprising a generally spherical housing at least a portion of which is at least partially transparent; means for mounting a video camera centrally within said spherical housing for continuous unidirectional panning movements about a panning axis that extends approximately through the center of said spherical housing and for tilting movements about a tilt axis that transverses said pan axes; rotary electric coupling means mounted to said housing; a video camera mounted to said camera mounting means; pan drive means including a pan electric motor for panning said camera mounting means, tilt drive means including a tilt electric motor for tilting said camera mounting means; and means for electrically connecting said video camera, said pan electric motor and said tilt electric motor through said rotary electric coupling means to ancillary electrical apparatuses.

12. The surveillance camera system of claim 11 wherein said housing has two generally hemispherically spaced domes releasibly mounted to each other.

13. The surveillance camera system of claim 12 wherein one of said domes is opaque and the other of said domes is partially transparent.

14. The surveillance camera system of claim 13 wherein said other dome is comprised of gold coated plastic.

15. The surveillance camera system of claim 11 wherein said camera mounting means comprises a bracket rotatably suspended from a mounting plate and a platform pivotably mounted to said bracket.

16. The surveillance camera system of claim 15 wherein said pan drive means comprises a sun gear rigidly mounted to said mounting plate between said plate and said bracket, an electric motor mounted to said bracket, and a planetary gear mounted to the drive shaft of said electric motor in mesh with said sun gear.

17. The surveillance camera system of claim 15 wherein said tilt means comprises a sun gear rigidly mounted to said bracket, an electric motor mounted to said bracket, and a pleanetary gear mounted to the drive shaft of said electric motor in mesh with said sun gear.

* * * * *